United States Patent Office 2,904,603
Patented Sept. 15, 1959

2,904,603

2,3-DIBROMO-1,2,3-TRICHLORO-1,1-DIFLUORO-PROPANE

Edgar M. Ilgenfritz, Midland, Mich., assignor to The Dow Chemical Company, Midland, Mich., a corporation of Delaware No Drawing. Application January 18, 1957
Serial No. 634,832

2 Claims. (Cl. 260—653)

This invention relates to a new halo organic compound and is more particularly concerned with 2,3-dibromo-1,2,3-trichloro-1,1-difluoropropane and with a method for its preparation.

The compound of the present invention inhibits the growth of and kills specific organisms of bacteria and fungus, as well as specific insects in fumigation tests. It has utility as a fumigant, being active at relatively low concentrations.

Preparation of the compound of the present invention is readily accomplished by the bromination of

CF$_2$Cl—CCl=CHCl in the presence of actinic light. Separation and purification of the dibromo-reaction product is readily accomplished by distillation under reduced pressure.

The following example is given to illustrate the present invention, but is not to be construed as limiting the invention thereto.

Example

An equimolecular quantity of bromine was added slowly to 1,2,3-trichloro-3,3-difluoropropene-1 contained in a flask irradiated with actinic light. The resultant mixture was stirred for one hour, washed with aqueous dilute sodium carbonate, dried, and distilled at thirty millimeters of mercury pressure absolute. There was thus obtained a 44 percent conversion and 76 percent yield of 2,3-dibromo-1,2,3-trichloro-1,1-difluoropropane,

CF$_2$Cl—CB$^r$Cl—CHB$^r$Cl boiling at 103 degrees centigrade at a pressure of 30 millimeters of mercury absolute. This material is a clear colorless liquid having a specific gravity ($d_4^{25}$) of 2.216, and an index of refraction ($n_D^{25}$) of 1.473.

When vapors of the compound of the present invention are contacted with common bacteria- and mold-forming organisms in standard fumigation tests, an inhibition of growth or complete kill of the organisms resulted, even when quantities as small as 1 pound of compound per 1000 cubic feet of space fumigated were employed. In other fumigation tests, at concentrations as low as 3 pounds of the compound of the present invention per 1000 cubic feet of space, 100 percent kills of both confused flour beetles and black carpet beetles were obtained in 16 hour exposure tests.

What is claimed is:
1. 2,3-dibromo-1,2,3-trichloro-1,1-difluoropropane.
2. The process which comprises: contacting equimolecular quantities of bromine and 1,2,3-trichloro-3,3-difluoropropene-1 in the presence of actinic light, and, separating 2,3-dibromo-1,2,3-trichloro-1,1-difluoropropane.

References Cited in the file of this patent

UNITED STATES PATENTS 2,676,193    Ruh ------------------ Apr. 20, 1954

OTHER REFERENCES

Henne et al.: Jour. Am. Chem. Soc., vol. 60, pages 2491–2495, October 1938.
Henne et al.: Jour. Am. Chem. Soc., vol. 63, pages 3476–3478, December 1941.
Simons: Fluorine Chemistry, vol. 1 (1950), Academic Press Inc. N.Y., N.Y., page 539.
Hauptschein et al.: Jour. Am. Chem. Soc., vol. 73, pages 5591 to 5593, December 1951.
Slesser et al.: Prep., Prop. and Tech. of Fluorine and Organic Fluoro Compounds, 1951, page 833, McGraw-Hill Book Co., Inc., N.Y., N.Y.